UNITED STATES PATENT OFFICE.

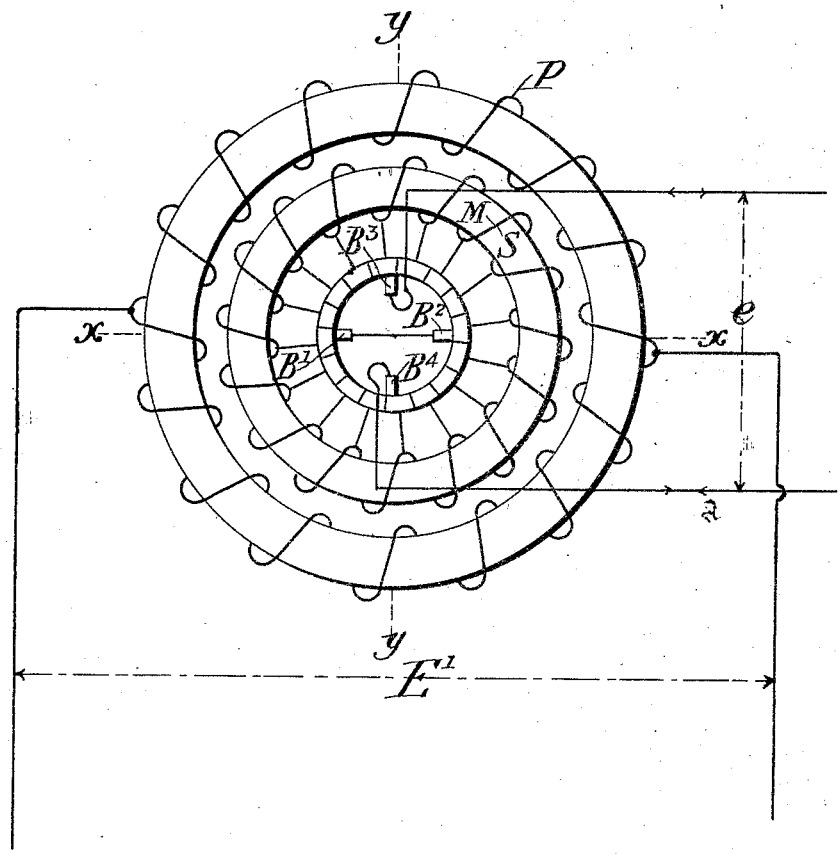

GABRIEL WINTER, DECEASED, BY OTTO WOLFRUM, ADMINISTRATOR, OF VIENNA, AUSTRIA-HUNGARY, AND FRIEDRICH EICHBERG, OF BERLIN, GERMANY; SAID WINTER AND SAID EICHBERG ASSIGNORS TO GENERAL ELECTRIC COMPANY, A CORPORATION OF NEW YORK.

DYNAMO-ELECTRIC MACHINE.

1,073,201. Specification of Letters Patent. Patented Sept. 16, 1913.

Original application filed June 11, 1902, Serial No. 111,180. Divided and this application filed January 9, 1912. Serial No. 670,161.

*To all whom it may concern:*

Be it known that we, OTTO WOLFRUM, residing at Vienna, Austria-Hungary, administrator of the estate of GABRIEL WINTER, deceased, and whose certificate of authority is recorded at page 433 of Liber S 90 of Transfers of Patents, and FRIEDRICH EICHBERG, a subject of the Emperor of Austria-Hungary, residing at Berlin, in the Empire of Germany, severally declare that the late GABRIEL WINTER and the said FRIEDRICH EICHBERG have invented certain new and useful Improvements in Dynamo-Electric Machines, of which the following is a specification.

This application is a division of application Serial No. 111,180, filed June 11, 1902, by the said Gabriel Winter and Friedrich Eichberg and which has resulted in United States Letters Patent No. 1,016,866 of February 6, 1912. In that former application, there is described an alternating-current motor of the commutator type in which the two members of the motor are provided with primary and secondary windings, respectively, arranged to produce a single magnetization along a fixed line constituting the working axis, means for supplying to the windings voltages of relatively varying magnitudes, and means for magnetizing the motor in a second direction at an angle to the first. As described in that application, the means for producing the second magnetization of the motor, comprises a magnetizing winding on either stator or rotor, which may be separate from the other two windings, or combined with either the primary or the secondary winding. As disclosed in that application the means for producing the second magnetization of the motor took in some cases the form of a magnetizing winding on the rotor, either separate from or combined with the working rotor winding, and to which current was preferably supplied through brushes bearing on the same or separate commutators at points substantially 90 electrical degrees from the working brushes.

The dynamo-electric machine which forms the subject-matter of the present application has a magnetizing winding on the rotor supplied with current in this manner, while the brushes of the secondary winding are short-circuited.

The drawing shows a motor arranged in accordance with this invention and is identical with Figure 8 of the former application referred to.

Let the primary and secondary windings (hereinafter called P and S) of an alternating current transformer, be arranged in the manner illustrated in the accompanying diagrammatic drawing, *i. e.*, as separate bi-polar ring windings disposed in such a way that S can move independently of P, while the points of connection of the primary winding to the source and the points between which the secondary winding is short-circuited, and therefore the magnetic poles of P and S are maintained on the line $x\ x$ (constituting the working axis), which can be easily attained by providing the winding S with a segmental commutator and short-circuiting the brushes situated on line $x\ x$. If now there be added to the windings P and S a magnetizing winding (hereinafter called M) so arranged that the current in it produces a magnetic field having the axis $y\ y$ at right angles to the axis of the field of windings P and S, and if the current supplied to the winding M corresponds as nearly as possible in phase to the currents in P and S; then a torque is produced which is proportional to the field of winding M, to the ampere turns of the rotor S, and to the cosine of the angle of displacement of phase between these last magnitudes. Upon rotation of the rotor in the field having the axis $y\ y$, *i. e.*, the field of winding M, there is generated a counter-electromotive force which has its greatest effective value on the line $x\ x$ and is in phase with the magnetic field having the axis $y\ y$, since it is generated by rotation in that field.

With increasing speed this counter-electromotive force along the line $x\ x$ due to rotation increases, and the rotor will continue to speed up until the counter-electromotive force plus the internal losses equals the electromotive force impressed upon the winding P. If the field of winding M equals the field of winding P the motor runs synchronously. All this is explained in the aforesaid original application and it is there also explained that the winding M may be separate from the winding S and may have a separate commutator, or the windings may be combined.

In the example shown in the drawing, a potential is applied to the stator winding P at points on line $x\ x$ from an outside source, and the commutator has short-circuited brushes $B^1$ and $B^2$ on the line $x\ x$ of the winding S. The magnetizing winding M is combined with the rotor winding S and is supplied with current from outside through commutator brushes $B^3$ and $B^4$ on the line $y\ y$, which is substantially 90 electrical degrees displaced from the line $x\ x$.

Machines constructed in accordance with the invention can be used as generators, because upon excitation through a determined magnetic field an electromotive force must in all cases arise at the rotating armature, and this electromotive force, quite independently of the number of revolutions of the rotor, is equal in phase and periodicity with the magnetic field.

The figure illustrates a bi-polar arrangement merely by way of example. For an apparatus having a greater number of poles the magnetic field axes $x\ x$ and $y\ y$ are, generally stated, inclined to one another at an angle of 90° divided by half the number of poles.

The windings on the stator are herein shown as ring windings but it must be understood that all known and suitable open or closed windings can be used. The windings on the rotor are also shown as ring windings but all suitable closed windings, such as are used for continuous currents and with segmental commutators, can be used.

What we claim as new and desire to secure by Letters Patent of the United States, is:—

1. An alternating current machine of the commutator type having brushes coöperating to form for each pair of primary poles, first a short-circuiting path along approximately the line of the primary field for the working currents in the armature, and second, means for generating at all speeds a torque-producing field by feeding an appropriate magnetizing current from outside to the armature.

2. An alternating current machine of the commutator type having brushes and connections therefor coöperating to form for each pair of primary poles, first a short-circuiting path along approximately the line of the primary field for the working currents in the armature, and second, means for feeding a magnetizing current from outside to the armature, the connections for feeding said magnetizing current being arranged to supply at all speeds current substantially in phase with the working currents.

3. An alternating current machine of the commutator type having two systems of brushes and connections therefor coöperating to form for each pair of primary poles first a short-circuiting path along approximately the line of the primary field for the working currents in the armature, and second, means for generating at all speeds a torque-producing field by feeding an appropriate magnetizing current from outside to the armature.

4. An alternating current machine of the commutator type having two systems of brushes and connections therefor coöperating to form for each pair of primary poles, first, a short-circuiting path along approximately the line of the primary field, for the working currents in the armature, and second, means for feeding a magnetizing current from outside to the armature, the connections for feeding the said magnetizing current being arranged to supply at all speeds current substantially in phase with the working currents.

In testimony whereof, we affix our signatures in the presence of two witnesses.

OTTO WOLFRUM,
*Administrator of the estate of Gabriel Winter, deceased.*

Witnesses to the signature of Otto Wolfrum:
August Fugger,
Ada Maria Berger.

FRIEDRICH EICHBERG.
Witnesses to the signature of Friedrich Eichberg:
Iwan Döry,
Leopold Janisok.